(No Model.)

G. W. FEATHERSTON.
COTTON CHOPPER.

No. 368,082. Patented Aug. 9, 1887.

Witnesses
Inventor
Giles W. Featherston,
By his Attorneys
Louis Bagger & Co.

UNITED STATES PATENT OFFICE.

GILES W. FEATHERSTON, OF CEDARTOWN, GEORGIA.

COTTON-CHOPPER.

SPECIFICATION forming part of Letters Patent No. 368,082, dated August 9, 1887.

Application filed November 17, 1886. Serial No. 219,158. (No model.)

*To all whom it may concern:*

Be it known that I, GILES W. FEATHERSTON, a citizen of the United States, and a resident of Cedartown, in the county of Polk and State of Georgia, have invented certain new and useful Improvements in Cotton-Choppers; and I do hereby declare that the following is a full, clear, and exact description of the invention, which will enable others skilled in the art to which it appertains to make and use the same, reference being had to the accompanying drawings, which form a part of this specification, and in which—

Figure 1:
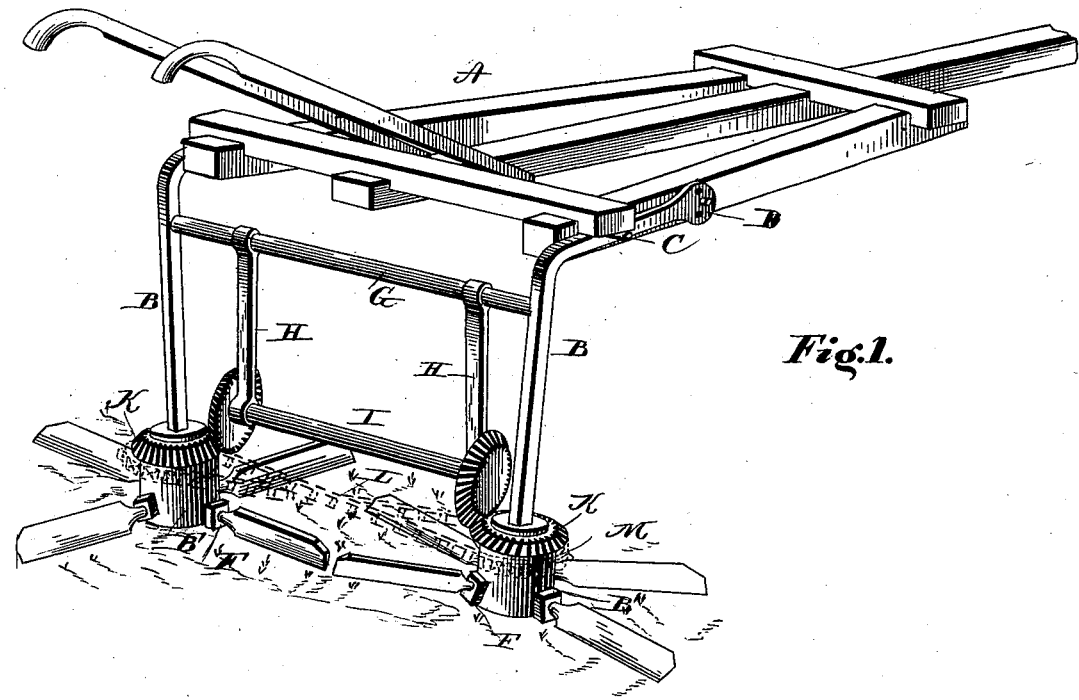
Figure 2:
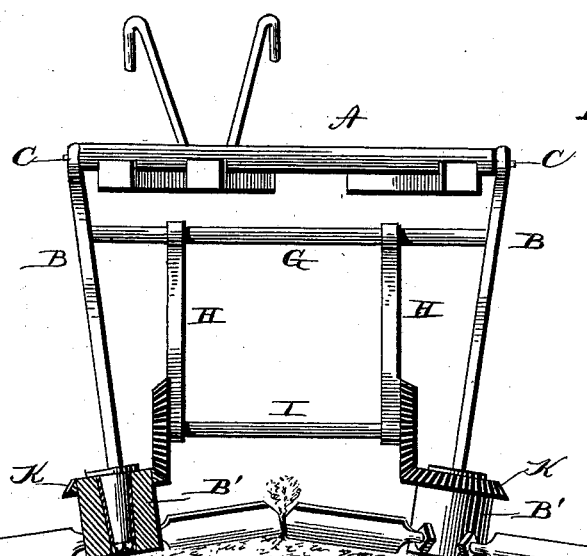

Figure 1 is a perspective view of my improved cotton-chopper, and Fig. 2 is a partially-sectionized rear view of the same.

Like letters of reference indicate corresponding parts in both the figures.

My invention has relation to cotton-choppers; and it consists in the improved construction and combination of parts constituting the same, as will be hereinafter fully set forth.

In the accompanying drawings, A represents the frame, the main beam of which is nearer to one side of the frame than the other, for the purpose of so locating the handles, which are attached thereto, that the driver may work at one side of the cotton-row upon which the chopper is operating.

On each side of the frame is a chopper-standard, B, which is pivoted to said frame upon the bolt C. The portion of each standard at the rear of said bolts extends downward at right angles to the other portion, which extends forward along each side rail of the frame and terminates in a sector, D, provided with adjustment-perforations, by means of which the angle between the standards and the frame may be regulated. The lower ends of the standards are formed like carriage-spindles, and upon them are journaled the chopper-hubs B', into which screw the shanks of the chopping-blades, said blades being firmly held in place by means of the jam-nuts F.

The standards are inclined toward each other at their lower ends to such an extent as to cause the chopping-blades of each side to rest upon the ground, the cotton being planted upon the top of a ridge or slight elevation. By this arrangement the choppers are rendered self-rotating, each side revolving to the rear at the outside of the chopper and to the front between the standards. As the inner points of the blades move in a circle of which the extreme point of the blade upon the opposite side of the hub is the center, they will cut the plants out of the row some little distance before they leave it. Before the following set of blades can approach each other sufficiently to cut any plants out of the row the machine has moved forward so far that enough plants will be left standing to constitute a hill.

To secure the standards in their inclined relation to each other, a cross-bar, G, is rigidly secured in each. From this cross-bar depend hangers H, in which is journaled a shaft, I, upon the ends of which are secured bevel gear-wheels. These wheels mesh with corresponding ones, K, which are attached to the upper ends of the hubs, thereby providing for making the rotation of the choppers simultaneous, the corresponding blades of the choppers always meeting together at the same time in the row of cotton-plants. The bevel-gear may be dispensed with and the simultaneous rotation of the choppers secured by means of a crossed sprocket-chain, L, and sprocket-wheels M, secured to the upper ends of the hubs; also, when there is not a perfect "stand" of the cotton, the cross-bar G may be taken out and one set of the choppers removed and the other set used alone.

Having thus fully described my invention, I claim—

1. A cotton-chopper provided with inclined standards, upon the lower end of each of which is journaled a set of chopping-blades which rotate in an inclined plane, the blades resting upon the ground at the outsides of the chopper, as and for the purpose set forth.

2. In a cotton-chopper, the combination of inclined standards, hubs journaled upon the lower ends of said standards and adapted to rotate by means of a part of the blades resting upon the ground, blades screwed into said hubs and secured there by jam-nuts on the shanks of said blades, as shown and described.

3. In a cotton-chopper, the combination of the standards, hubs carrying chopping-blades journaled upon said standards, so that a part of the blades rest upon the ground, bevel gear-wheels upon the upper ends of said hubs, and corresponding gear-wheels journaled upon a shaft extending between said standards, as and for the purpose set forth.

4. In a cotton-chopper, the combination of the standards provided with hub-carried chopping-blades, a bar secured between the standards, hangers depending from said bar, a shaft journaled in said hangers, bevel-gear secured upon said shaft, and corresponding bevel-gear secured to the hubs of the choppers, as shown and described.

5. In a cotton-chopper, the combination, with the frame thereof, of the chopper-standards pivoted to the sides of the frame, the lower portions of said standards formed at right angles to the upper portions, said upper portions extending along the frame forward of the pivotal bolt and provided with sectors perforated with adjustment-holes, and revolving choppers secured to said standards, as specified.

6. A cotton-chopper the main beam of which is arranged nearer one side of the frame than the other, and having the handles attached thereto, in combination with a pair of revolving choppers secured at the lower ends of standards attached to the side of the frame, said choppers being adapted to pass upon opposite sides of the row.

In testimony that I claim the foregoing as my own I have hereunto affixed my signature in presence of two witnesses.

GILES W. FEATHERSTON.

Witnesses:
L. S. LEDBETTER,
JUDSON CRABB.